United States Patent [19]
Hong et al.

[11] 3,764,788
[45] Oct. 9, 1973

[54] ERROR CHECKING CIRCUIT

[75] Inventors: Se J. Hong; Darryl S. Jones; Daniel L. Ostapko, all of Poughkeepsie, N.Y.

[73] Assignee: International Business Machines Corporation, Armonk, N.Y.

[22] Filed: June 30, 1972

[21] Appl. No.: 267,797

[52] U.S. Cl. .............................................. 235/153 A
[51] Int. Cl. .............................................. G06f 11/00
[58] Field of Search ................. 235/153 A, 153 AC, 235/153 R; 340/172.5

[56] References Cited

OTHER PUBLICATIONS

Sellers et al, Analyzing Errors with the Boolean Difference, IEEE Trans. on Computers, Vol. C–17, July 1968, pp. 676–683.
Necula, An Algorithm for the Automatic Approximate Minimization of Boolean Functions, IEEE Trans. on Computers, Vol. C–17, No. 8, August 1968, pp. 770–782.

*Primary Examiner*—Charles E. Atkinson
*Attorney*—William S. Robertson et al.

[57] ABSTRACT

A new circuit is provided for checking for errors caused by most but not all of the faults that might occur in a network of logic gates. One part of the checking circuits, called a "1 cover" produces an output that is designated C1, and includes selected prime implicants of the function, F, of the newtork being checked. Thus, if there is no fault in either the circuit being checked or in the 1 cover circuit, C1 = 1 implies that F = 1. A comparison circuit is provided to produce an error signifying output, E, for the condition C1 = 1 and F = 0.

Similarly, another part of the checking circuit, called a "0 cover" produces an output that is designated CO and includes selected prime implicants of the complement, $\overline{F}$, of the circuit being checked. The comparison part of the checking circuit detects the condition CO = 1, $\overline{F}$ = 0, as an error condition.

Thus, the checking circuit of this invention operates according to the equation $E = FCO + \overline{F}C1$. The circuit responds to a high portion of the possible faults in the circuit being checked but it has many fewer components than the circuit being checked.

10 Claims, 6 Drawing Figures

FIG. 1
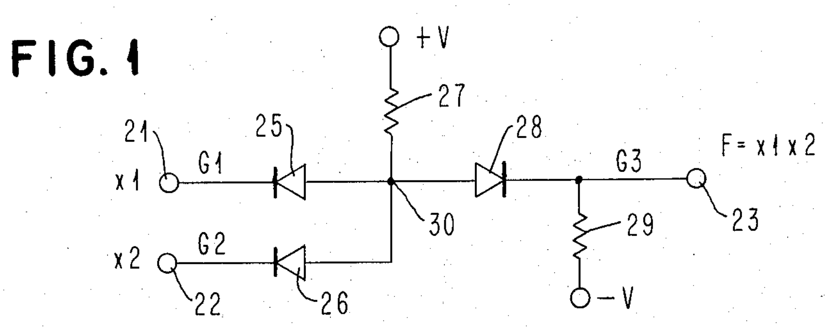
FIG. 2
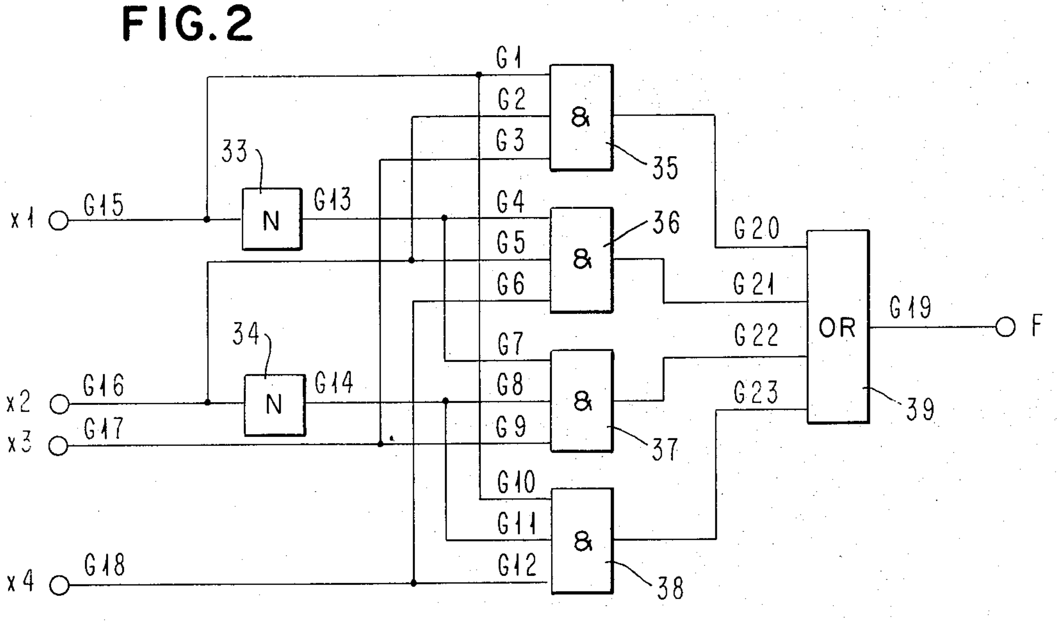
FIG. 3
| x3 x4 \ x1 x2 | 00 | 01 | 11 | 10 |
|---|---|---|---|---|
| 00 | 0 | 0 | 0 | 0 |
| 01 | 0 | 1 | 0 | 1 |
| 11 | 1 | 1 | 1 | 1 |
| 10 | 1 | 0 | 1 | 0 |
$$F = x1\,x2\,x3 + \overline{x1}\,x2\,x4 + \overline{x1}\,\overline{x2}\,x3 + x1\,\overline{x2}\,x4$$

FIG. 4

| CHECK POINTS | 1 | | 2 | | 3 | | 4 | | 5 | | 6 | | 7 | | 8 | | 9 | | 10 | | 11 | | 12 | |
|---|---|---|---|---|---|---|---|---|---|---|---|---|---|---|---|---|---|---|---|---|---|---|---|---|
| STUCK AT | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
| P1 | | √ | | √ | | √ | | | | | | | | | | | | | | | | | | |
| P2 | | | | | | | | √ | | √ | | √ | | | | | | | | | | | | |
| P3 | | | | | | | | | | | | | | √ | | √ | | √ | | | | | | |
| P4 | | | | | | | | | | | | | | | | | | | | √ | | √ | | √ |
| P5 | | √ | | √ | | √ | | √ | | √ | | √ | | √ | | √ | | √ | | √ | | √ | | √ |
| Q1 | | | | | √ | | √ | | | | | | | | | | | | | | √ | | | |
| Q2 | √ | | | | | | | | | | √ | | | | √ | | | | | | | | | |
| Q3 | | | | | | | | | √ | | | | | | | | √ | | √ | | | | | |
| Q4 | | | √ | | | | | | | | | | √ | | | | | | | | | | √ | |
| Q5 | | | | | √ | | | | | | √ | | | | | | √ | | | | | | √ | |

| CHECK POINTS | 13 | | 14 | | 15 | | 16 | | 17 | | 18 | | 19 | | 20 | | 21 | | 22 | | 23 | | | |
|---|---|---|---|---|---|---|---|---|---|---|---|---|---|---|---|---|---|---|---|---|---|---|---|---|
| STUCK AT | 1 | 0 | 1 | 0 | 1 | 0 | 1 | 0 | 1 | 0 | 1 | 0 | 1 | 0 | 1 | 0 | 1 | 0 | 1 | 0 | 1 | 0 | F | N |
| P1 | | | | | | √ | | √ | | √ | | | | √ | | √ | | | | | | | 8 | 3 |
| P2 | | √ | | | √ | | | √ | | | | √ | | √ | | | | √ | | | | | 9 | 3 |
| P3 | | √ | | √ | √ | | √ | | | √ | | √ | | | | | | | | √ | | | 10 | 3 |
| P4 | | | | √ | | √ | √ | | | | | √ | | √ | | | | | | | | √ | 9 | 3 |
| P5 | | √ | | √ | | | | | | √ | | √ | | √ | | √ | | √ | | √ | | √ | 21 | 2 |
| Q1 | √ | | √ | | | √ | | √ | √ | | | | √ | | √ | | √ | | | | √ | | 12 | 3 |
| Q2 | | | √ | | √ | | | √ | | | √ | | √ | | √ | | √ | | √ | | | | 11 | 3 |
| Q3 | | | | | √ | | √ | | √ | | | | √ | | | | √ | | √ | | √ | | 10 | 3 |
| Q4 | √ | | | | | √ | √ | | | | √ | | √ | | √ | | | | √ | | √ | | 11 | 3 |
| Q5 | | | | | | | | | √ | | √ | | √ | | √ | | √ | | √ | | √ | | 11 | 2 |

FIG. 5

| | | | | | |
|---|---|---|---|---|---|
| ORDER OF SELECTION | 1 | 2 | 3 | 4 | 5 |
| SELECTED PRIME IMPLICANT | P5 | Q1 | Q2 | Q3 | Q4 |
| F-VALUE AT SELECTION | 21 | 12 | 6 | 4 | 3 |
| FAULT COVERAGE % | 46 | 72 | 85 | 94 | 100 |
| DESIGNATION | C1 | C0 | C0 | — | — |

ERROR CHECKING CIRCUIT

BACKGROUND OF THE INVENTION

A review of some of the known techniques for checking errors in logic devices will be a helpful introduction to the checking circuit of this invention. For example, the bits that make up a data message can be encoded to provide a parity bit or to provide a set of check bits. By re-encoding the message and comparing the new parity bit or the new check bits with the old, certain kinds of errors can be detected or corrected. As an example that is more specifically relevant to this invention, a duplicate of the logic circuit to be checked may be provided and the outputs of the two circuits may be compared to detect whether an error has occurred in one of the circuits. When the original logic function is triplicated, three outputs can be compared and any two matching outputs can be considered to be correct.

Duplicating or triplicating a logic function is often costly, even for a rather simple logic function. Furthermore, the additional components required for duplication provide an additional source of errors:
a network having twice as many gates would probably have twice as many faults. An object of this invention is to provide a new and improved checking circuit that has only a few logic gates in comparison with the network to be checked and checks many but not all of the possible error conditions of the network.

SUMMARY OF THE INVENTION

As is well known, a sequential or combinatorial logic function can be expressed as the logical sum of its prime implicants. (A review definition of "prime implicant" and related terms is given later.) According to this invention, a circuit that will be called a "1 cover" and designated C1 is constructed to produce a function that is a subset of the prime implicants of the function being checked, F. A circuit called a "0 cover" and designated CO is constructed to produce a function that is a subset of the prime implicants of the complement function, $\overline{F}$. A comparison circuit receives these four terms and produces an error signifying output according to the logic function $E = FC0 + \overline{F}C1$.

It will be helpful at this point to compare the generalized form of the checking circuit that has been presented so far with the prior art duplication and triplication systems that have been described in the section "Background Of The Invention." In the prior art duplication system, the duplicating function can be designated F*. Unless there is an error, the original function F = F*. In other words, $E = F \forall F^*$ or $E = F\overline{F}^* + \overline{F}F^*$. (The symbol $\forall$ represents the Exclusive OR operation in which two bits are compared.) This expression is similar in form to the expression $E = FC0 + \overline{F}C1$ that applies to the circuit of this invention; and for the special case C1 = F*, the 1 cover in the circuit of this invention corresponds directly to the duplicating circuit in the prior art. Similarly, for $C0 = \overline{F}^*$, the 0 cover corresponds in function but not in structure to a single gate in the prior art for inverting F to form $\overline{F}$ for the logical product $F\overline{F}^*$ in the prior art.

This comparison of the prior art and a special case of the circuit of this invention is presented only as a starting point from which the differences can be more readily understood. The circuit of this invention is particularly intended for applications where the original logic function F is rather complex and the terms C0 and C1 contain only a few of the prime implicants of the function F. A technique for selecting the prime implicants can be more easily understood from a specific example that will be given later. For a wide range of applications, it appears that a checking network having about 30 percent of the number of gates of the network being checked will detect about 90 percent of the possible errors of the network.

THE DRAWING

FIG. 1 shows a conventional logic gate that shows some of the concepts used in the checking circuit of this invention.

FIG. 2 shows an example of logic network that is to be checked by the circuit of this invention.

FIG. 3 represents the logic function of the circuit of FIG. 2 as a Karnaugh map.

FIG. 4 is a chart of the possible fault conditions in the circuit of FIG. 2 and the prime implicants that are affected by each fault.

FIG. 5 is a table showing the assignment of prime implicants of the circuit of FIG. 2 to the checking circuits C0 and C1.

THE CHECKING CIRCUIT OF THE DRAWING

Introduction - FIG. 1

Figure 6:
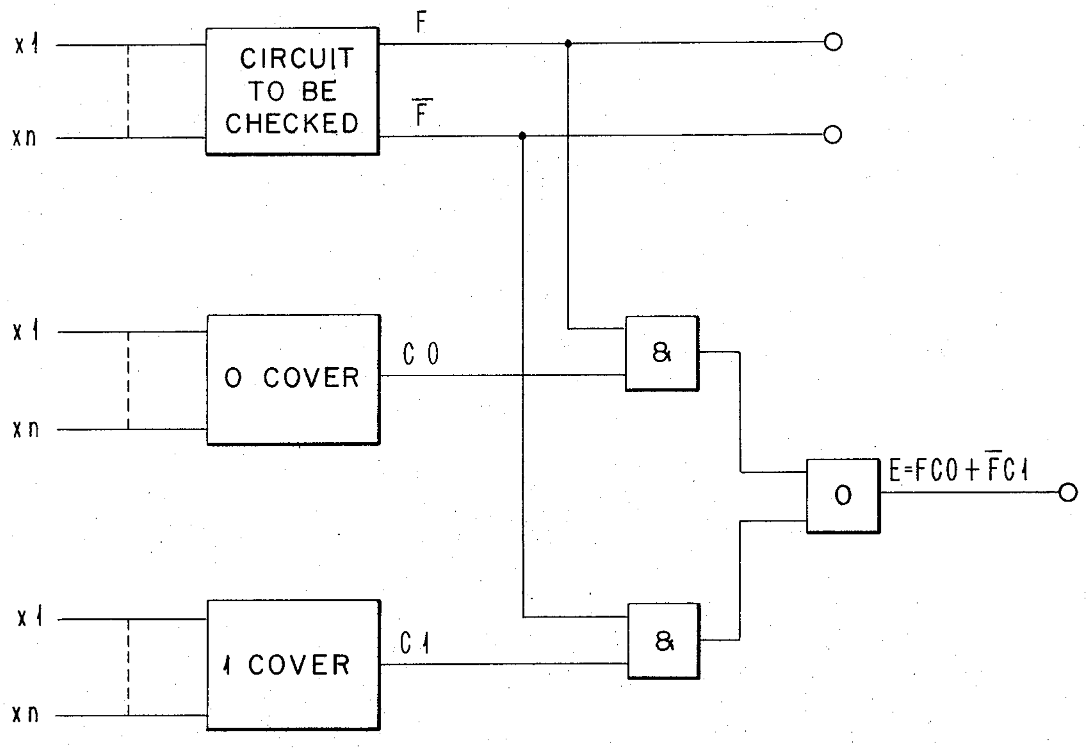
FIG. 6 shows the checking circuit of this invention.

A "fault" in a logic network can be thought of as a "stuck 1" or a "stuck 0" at one of the input ports or output ports of the gates of the network. FIG. 1 shows a circuit schematic of a well known AND logic gate that will help to explain these terms. The gate receives the logic variables $x1$ and $x2$ at input ports 21 and 22 and produces the logic function $F = x1x2$ at an output port 23. A logical 1 is represented by a predetermined positive voltage level at ports 21, 22 and 23 and a logical 0 is represented by a voltage having a predetermined value that is negative with respect to the 1 signifying voltage. In the fault free operation of the circuit, a 1 signifying positive voltage appearing at both ports 21, 22 turns off diodes 25 and 26 and as a result current flows only in the circuit of resistor 27, diode 28, and resistor 29 to produce a positive voltage at output port 23 that signifies a logical 1. This operation corresponds to the logical condition $x1x2 = 1$. If a 0 signifying voltage is applied to either or both input ports 25 or 26, an increased current flows through resistor 27 and diodes 25 and/or 26 and produces a more negative voltage at output port 23 which signifies a logical 0.

Suppose, for example, that diode 25 becomes open circuited. In this fault, condition, node 30 would vary in potential with the signal $x2$ at input port 22 independently of the value of logic variables $x1$. Thus, input port 21 is "stuck" at a logical 1 value and the logic function of the gate can be represented as F = (1)B or, in simpler form, F = B.

If input port 25 is accidentially shorted to ground, node 30 will be maintained at a 0 signifying voltage without regard to the actual value of logic variables $x1$ or $x2$. Thus, input port 21 is "stuck" at 0 and the gate now has the logic function F = (0)B or, more simply, F = 0.

As FIG. 1. also illustrates, certain kinds of circuit failures, such as the open circuit of diode 25, affect only the gate in which the failure occurred. By contrast, some faults, such as the grounding of input port 21, produce similar faults at any other input port to which the fault point is directly connected. In a particular logic network, a stuck 1 or stuck 0 at one port may or may not affect another port that it is directly connected to; the result depends on the types of logic gates used and on whether buffer circuits are used between interconnected ports. In the analysis that follows, interconnected ports that are independent are given separate designations, and a designation of a common point ahead of interconnected ports identifies a fault that affects both ports.

Introduction - Terminology

There are several equivalent ways of writing the logic function of a network. FIG. 3 shows both a Karnaugh map and an equivalent algebraic expression for the function of the network of FIG. 2 which will be described later. The algebraic function is in the form of the sum (logical OR) of products (logical AND). The Karnaugh map also can be thought of as the sum of products since each block shows the 1 or 0 state of the products of the terms shown in the associated row and column headings. For example, the row heading 10 and the column heading 01 define the product $x1\overline{x2x3}x4$ and the 1 in the block at the intersection of this row and column signifies that $x1\overline{x2x3}x4$ is a term of the function F and, equivalently, that if $x1\overline{x2x3}x4 = 1$, then F = 1. The entire function F is the sum of the products for which the map contains a 1. Similarly, the complement function $\overline{F}$ is the sum of products for which the map contains a 0.

When an algebraic expression is written with a separate product for each entry in the corresponding map, it is called the standard sum. Such an expression can often be simplified by combining pairs of terms in which a variable will cancel. For example, the standard sum $F = AB\overline{C} + ABC + A\overline{B}C + ABC$ can be simplified to $F = AB + A\overline{C} + \overline{B}C$ by combinations such as $ABC + AB\overline{C} = AB(C+\overline{C}) = AB$. The terms AB, AC, and BC are called the "prime implicants" of the function F. In the Karnaugh map these terms can be found by grouping all adjacent terms that are not subsets of other groupings. The expression $F = AB + A\overline{C} + \overline{B}C$ can be further simplified to F = AC + BC, which is called the "minimum sum."

The Circuit of FIGS. 2 and 3

In FIG. 2, gates 33 through 39 are interconnected to form a logic network having the minimum sum function $F = x1x2x3+\overline{x1}x2x4+\overline{x1x2}x3+x1\overline{x2}x4$. The arrangement of the gates in the network is closely similar to the arrangement of the terms in this function and the normal operation of this circuit will be apparent without specific discussion.

In the circuit of FIG. 2, the characters G1 through G23 identify 23 ports where a stuck 1 or a stuck 0 may occur. Note that the output port of AND gate 35 is directly connected to an input port of OR gate 39 and this connection is considered as a single fault point which is designated G20. Conversely, the characters G1, G10 and G15 designate three separate fault points even though the associated ports are directly interconnected. As explained already, faults may occur independently at points G1 and G10; however a fault at point G15 would also appear at points G1 and G10 and other points downstream from point G15.

As the map of FIG. 3 shows, the four terms shown in the preceding equation (which also appear at the outputs of gates 35–38) are prime implicants of F, and F contains another prime implicant, $x3x4$. These prime implicants will be designated P1 through P5 as shown here.

$P1 = x1x2x3$ $P4 = x1\overline{x2}x4$
$P2 = \overline{x1}x2x4$ $P5 = x3x4$
$P3 = \overline{x1x2}x3$ Similarly, the complement function $\overline{F}$ has these prime implicants.

$Q1 = x1x2\overline{x3}$ $Q4 = x1x2\overline{x3}$
$Q2 = x1\overline{x2x4}$ $Q5 = \overline{x3x4}$
$Q3 = \overline{x1x2x3}$ As will be discussed next, the prime implicants of F and $\overline{F}$ relate a fault at any one of the check points to an error in the network output.

Faults and Prime Implicants - FIG. 4

In the table of FIG. 4, the column headings 1 through 23 identify the check point in the network of FIG. 2, and each of the columns has two subheadings for the conditions that the check point is stuck at 1 and stuck at 0. The row headings identify the prime implicants P of the function $\overline{F}$ and the prime implicants Q of the function $\overline{F}$. A check mark in the table indicates that the stuck 1 or stuck 0 condition at the point identified in the column heading affects the prime implicant in the row heading. An example wll help to explain the table.

When point G1 is stuck at 0, gate 33 produces a 0 signifying output. The network continues 1 and 0 outputs, but now only three of the AND gates are effective and it can be described by different minimum sum expressions.

F (G1 stuck at 0) $= \overline{x1}x2x4 + \overline{x1x2}x3 + x1\overline{x2}x4$
$\overline{F}$ (G1 stuck at 0) $= \overline{x3x4} + x1x2 + x1\overline{x2x4} + \overline{x1}x2\overline{x4}$ Since the stuck 0 condition at point G1 has caused the expression for F to lose the term $x1x2x3$ but not to gain any terms, the fault may cause F to be 0 when it should be 1. This error would occur when $x1x2x3 = 1$ and each of the other minimum sum terms for F is 0. However, in the particular network of FIG. 2 there is no way for a stuck 0 at point G1 to cause F to be 0 when it should be a 1. (But some faults will produce both 1 and 0 errors, as will be explained later.) It will be helpful to summarize this relationship.

| Intended Value of x1x2x3 | F | Significance |
|---|---|---|
| 0 | 0 | error masked |
| 0 | 1 | error masked |
| 1 | 1 | can't tell |
| 1 | 0 | error |

Thus, an error occurs only when the intended value is 1 and F = 0. Conversely, this condition implies that an error has occurred. (As will be explained later, the fault may be in the checking circuit and not in the circuit being checked; that is, the assumption made in this paragraph that $x1x2x3$ has an intended value of 1 may have been an incorrect assumption.) A similar analysis of the function $\overline{F}$ (G1 stuck at 0) would show the same result in a different form: the condition $x1x2x3 = 1$ and $\overline{F} = 1$ implies an error and in the other combinations the fault is either masked or it is impossible to tell by the general analysis presented here whether an error has occurred. Thus, this analysis does not lead to additional error checking capability.

As the preceding paragraphs of this section have shown, the relationship between a fault at a particular point in a network and a possible error at the network output can be analyzed in terms of a circuit schematic such as FIG. 2 or an equivalent minimum sum logic expression. It is an important feature of this invention that the cover circuits are based on the prime implicants of the function rather than on the minimum sum terms or the corresponding gates of the circuit to be checked. Continuing the example of G1 stuck at 0 will show the advantage of this feature.

By looking at the Karnaugh map of FIG. 3, it can be seen that the effect of G1 stuck at 0 is to change the two 1's in column 11 to 0's. As has already been explained, this fault eliminates the minimum sum term $x1x2x3$ and, of course, the corresponding prime implicant P1 = $x1x2x3$. As the map shows, the fault also eliminates the prime implicant P5 = $x3x4$. Two prime implicants are eliminated by this fault because both prime implicants contain the common term $x1x2x3x4$ which is supplied in the network of FIG. 2 only by gate 35, the gate that is disabled by the fault of this example.

A similar analysis for G1 stuck at 1 which shows that the prime implicant Q2 is eliminated from the function $\overline{F}$ but that no other detectable errors are caused by this fault. Thus, column 1 of FIG. 4 contains check marks for the prime implicants P1 and P5 in the stuck at 0 column and it contains a check mark for the prime implicant Q2 and the stuck at 1 column.

The check marks in column 1 of the table of FIG. 4 can be found by an equivalent technique that uses the concept of the Boolean difference which is designated dF/dG1 for the point G1 of this example. The Boolean difference equals the Exclusive OR function, F (G1 stuck at 0) $\veebar$ F (G1 stuck at 1). The function F (G stuck at 0) has already been given but can be written in a form that is more useful at this point as F (G stuck at 0) = F ($\overline{x1x2x3}$). Similarly, F (G1 stuck at 1 = F + $x1x2x3$. The Boolean difference, which is the Exclusive OR function of these terms can be written in simplified form as F ($\overline{x1x2x3}$) + $\overline{F}$ ($x1x2x3$). Thus, the Boolean difference contains the terms that are affected by the fault and the original function or its complement. Multiplying by F or $\overline{F}$ to remove the complement of these terms in these expressions gives the significant variables for a fault at point G as follows:

G1 stuck at 0: dF/dG1(G1)
G1 stuck at 1: dF/dG1($\overline{G1}$)

The Checking Circuit - FIG. 6

FIG. 6 shows the circuit of FIG. 2 in a generalized block form that applies to other combinatorial or sequential logic circuits to be checked. The circuit to be checked receives inputs designated $x1$ through $xn$ which correspond to the four inputs in the specific circuit of FIG. 2. The circuit produces an output F and it either produces a complement output $\overline{F}$ or the checking circuit of this invention is provided with an inverter to form F.

A 0 cover circuit and a 1 cover circuit receive the same set of inputs as the circuit to be checked, but in a specific application the 0 cover and 1 cover circuits each contain only selected ones of the inputs of the circuit to be checked. The 0 cover circuit produces an output C0 that contains selected prime implicants of the function $\overline{F}$. In the simple example in which G1 is the only point in the circuit of FIG. 2 where a fault is to be considered, C0 = Q2, the only prime implicant of $\overline{F}$ that is affected by a fault at point G1. Gates shown in the drawing combine C0 and F in an AND logic function and produce an error signifying output.

Suppose that F = 1 and C0 = 1 (or, in a form more related to the circuit of FIG. 6, FC0 = 1). From the previous analysis it is apparent that this condition can occur only if an error has occurred in either the circuit to be checked or in the 0 cover circuit. In particular situations, the cover circuit may be much simpler than the corresponding components of the circuit to be checked so that the error might be assigned to the circuit to be checked because of the probability that it is more likely to fail. However, in the general form in which FIG. 6 shows the circuits, a fault is equally likely in either the circuit to be checked or the 0 cover and duplicate cover circuits would be required for correcting errors.

Similarly, the 1 cover circuit produces an output C1 that contains the prime implicant of F that is affected by a fault at point G1. As has already been explained in the introductory description of FIG. 4, the prime implicants P1 and P5 are both affected by a stuck 0 at point G1. It is important to note that only one of these prime implicants is needed and that either (or both) of them can be selected. The selection of the appropriate prime implicants for the two cover circuits is important in optimizing the fault coverage and minimizing the problems that occur in providing the additional checking circuits. Commonly, it is advantageous to cover as many fault conditions as possible with the fewest number of prime implicants. The next section will explain how the circuit of FIG. 6 is constructed according to these goals.

Selecting the Prime Implicants - FIGS. 4 and 5

As the check marks in FIG. 4 show, some of the prime implicants are affected by many of the possible fault conditions and some are affected by only a few. In the column designated F, the numbers show the number of checks marks for the corresponding prime implicant. Prime implicant P5 is affected by the highest number of faults, 21, and the prime implicant Q1 is affected by the second highest number, 12. Thus, a checking circuit that produced only prime implicant P5 would check 21 of the 46 possible fault conditions of the circuit of FIG. 2. Since no other prime implicant provides this much coverage, P5 is the first choice for a cover circuit that is intended to provide the widest coverage with the simplest logic. The leftmost column of the table of FIG. 5 summarizes the effect of selecting P5. The table also shows that prime implicant P5 is assigned to cover circuit C1 (since P5 is a prime implicant of the function F) and that it covers 46 percent of the possible fault conditions.

It can be seen from FIG. 4 that the prime implicant P5 covers fault conditions that are also covered by other prime implicants. As has already been explained, when a fault has been covered by one prime implicant, the checking capability would not be improved by selecting an additional prime implicant covering only the same faults. Accordingly, in choosing a next prime implicant, the fault columns that are already covered are ignored and only the faults not yet covered are considered. For the particular circuit of FIG. 2, there is no overlap between the coverage of the first prime implicant P5 and the prime implicant Q1 having the next highest fault coverage. Thus, as FIG. 5 shows, a checking circuit in which the 1 cover circuit produced only the output C1 = P5 and the 0 cover circuit produced only the output C0 = Q1 would cover 72 percent of the possible fault conditions of the circuit. Thus, it can be seen that providing both a 1 cover and a 0 cover circuit provides substantially more optimum coverage than can be provided by the same amount of logic in only a 0 cover circuit or a 1 cover circuit. For example, a 1 cover circuit based on P5 and any other additional prime implicant would cover only two more fault conditions for a total fault coverage of only 50 percent.

Some of the faults covered by Q1 are also covered by other prime implicants of $\overline{F}$ and the number of check marks in column F are preferably recalculated before selecting a next prime implicant. These values now apply to the circuit.

| Prime Implicant | N |
|---|---|
| P1 | 0 |
| P2 | 1 |
| P3 | 2 |
| P4 | 1 |
| Q2 | 6 |
| Q3 | 6 |
| Q4 | 6 |
| Q5 | 6 |

Notice that any one of the remaining prime implicants of $\overline{F}$ could be chosen to provide coverage for an additional 6 faults. The prime implicant Q2 is chosen in the example and it increases the fault coverage to 85 percent. Prime implicants Q3 and Q5 cover 4 and 3 respectively additional faults and raise the coverage to 94 percent and 100 percent respectively.

It can be seen that the fault coverage rises rapidly with the first few prime implicants that are chosen and that the improvements are smaller for each additional prime implicant. Thus, a cover circuit having a few prime implicants provides an optimum coverage. A simple circuit has been chosen to illustrate the invention but the advantages are more significant in circuits of more typical complexity. A cover circuit having 20–30 percent of the number of gates in the circuit.

The column N in the table of FIG. 4 lists the number of variables in the prime implicant and this is an indication of the complexity of forming the prime implicant in the cover circuit. Where prime implicants give equal fault coverage, the prime implicant that is simplest to form may be chosen.

Other Embodiments of The Invention

The circuit shown in the generalized form of FIG. 6 applies to a wide range of combinatorial and sequential logic circuits and the description of the 0 cover and 1 cover can be applied easily to any given network to be checked. Circuits with multiple outputs can be checked either with independent cover circuits for each output or the cover circuits for such a network can be minimized by standard design techniques.

The circuit can be modified to provide some correction capabilities with only a few additional gates. Since C0 is a subset of $\overline{F}$ and C1 is a subset of F, C0 and C1 can both be 1 in the fault free operation. Thus, C0C1 = 1 means that there is an error in the checking circuit. Since the output of the checking circuit can be checked, an error indicated by the checking circuit can be assigned to either the network to be checked or the cover circuits. Thus, F(corrected) = F∀E∀(C0C1); an Exclusive OR circuit inverts the network output when an error E is found unless the checking circuit is in error.

Those skilled in the art will recognize a wide range of applications for the checking circuit of the invention within the spirit of the invention and the scope of the claims.

What is claimed is:

1. A checking circuit for a network of interconnected logic gates having as an output a function F of inputs *x*1*x*2. . .*xn*, comprising, first logic means connected to form an output function C1 composed of selected prime implicants of said function F, second logic means connected to form an output function C0 composed of selected prime implicants of the complement $\overline{F}$ of said function F, and third logic means connected to receive said functions F, $\overline{F}$, C0 and C1 and to produce an error signifying output E according to the relationship E = FC0 + $\overline{F}$C1.

2. The checking circuit of claim 1 wherein a fault in the network to be checked is defined as a stuck 1 or a stuck 0 at one of a predetermined number of check points in the network to be checked and said first and second logic means are a 1 cover circuit and a 0 cover circuit respectively, and said cover circuits include means to produce a first prime implicant that covers a largest number of said faults and a second prime implicant that covers a largest number of faults not covered by said first prime implicant.

3. The checking circuit of claim 2 wherein one of said cover circuits includes means to produce said first prime implicant and the other of said cover circuits includes means to produce said second prime implicant.

4. The checking circuit of claim 3 wherein the cover circuits include logic gates to produce a number of said prime implicants covering about 90 percent of said faults.

5. The checking circuit of claim 4 wherein said cover circuits include not more than 30 percent as many gates as the network being checked.

6. The checking circuit of claim 2 wherein at least one of the prime implicants of C1 is not a minimum sum term of F.

7. The checking circuit of claim 6 wherein one of said cover circuits produces a prime implicant that is a minimum sum term of F.

8. The checking circuit of claim 6 wherein one of said cover circuits produces a prime implicant that is a minimum sum term of F.

9. The checking circuit of claim 2 wherein at least one of said prime implicants does not appear at any discrete point in the network to be checked.

10. The checking circuit of claim 2 including means producing a corrected function F(corrected) = F∀E∀(C0C1).

* * * * *